US012735262B1

(12) United States Patent
Ormiga Galvao Barbosa

(10) Patent No.: US 12,735,262 B1
(45) Date of Patent: Sep. 15, 2026

(54) ROBOTIC RETRIEVAL FOR DENSE STORAGE

(71) Applicant: Amazon Technologies, Inc., Seattle, WA (US)

(72) Inventor: Alexandre Ormiga Galvao Barbosa, Medford, MA (US)

(73) Assignee: Amazon Technologies, Inc., Seattle, WA (US)

(*) Notice: Subject to any disclaimer, the term of this patent is extended or adjusted under 35 U.S.C. 154(b) by 503 days.

(21) Appl. No.: 18/226,427

(22) Filed: Jul. 26, 2023

(51) Int. Cl.

| | |
|---|---|
| ***B65G 1/137*** | (2006.01) |
| ***B25J 5/00*** | (2006.01) |
| ***B65G 1/06*** | (2006.01) |
| ***G06Q 10/087*** | (2023.01) |

(52) U.S. Cl.
CPC ........... *B65G 1/1375* (2013.01); *B65G 1/065* (2013.01); *B65G 1/1373* (2013.01); *B25J 5/007* (2013.01); *G06Q 10/087* (2013.01)

(58) Field of Classification Search
CPC ........ B65G 1/1375; B65G 1/065; B25J 5/007; G06Q 10/087
See application file for complete search history.

(56) References Cited

U.S. PATENT DOCUMENTS

| | | | | |
|---|---|---|---|---|
| 2018/0237221 | A1* | 8/2018 | Lindbo | E04B 1/94 |
| 2019/0375590 | A1* | 12/2019 | Gravelle | B65G 1/0478 |
| 2021/0032027 | A1* | 2/2021 | Fjeldheim | B65G 1/0485 |
| 2022/0242668 | A1* | 8/2022 | Perez | B65G 1/0478 |

FOREIGN PATENT DOCUMENTS

| | | | | |
|---|---|---|---|---|
| WO | WO-2020038144 A1 * | 2/2020 | | G07F 17/12 |

OTHER PUBLICATIONS

WO-2020038144-A1 (Year: 2020).*

* cited by examiner

*Primary Examiner* — Ernesto A Suarez
*Assistant Examiner* — Laurence R Brothers
(74) *Attorney, Agent, or Firm* — K&L Gates LLP

(57) ABSTRACT

In various examples, systems and methods for robotic retrieval are described. A storage block including a grid of a plurality of storage pods in a robot-controlled storage field may be determined. Each storage pod of the plurality of storage pods may include a plurality of items. The grid may include a plurality of cells, where each cell represents a position within the grid occupiable by a storage pod. A first storage pod located at a first cell of the grid may be determined. The first cell may be an interior cell of the grid. A second cell of the grid may be determined, where the second cell is unoccupied by a storage pod. At least one robotic drive may be controlled to shift storage pods toward the second cell.

20 Claims, 7 Drawing Sheets

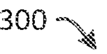

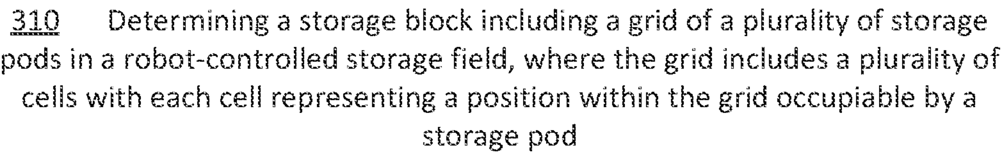

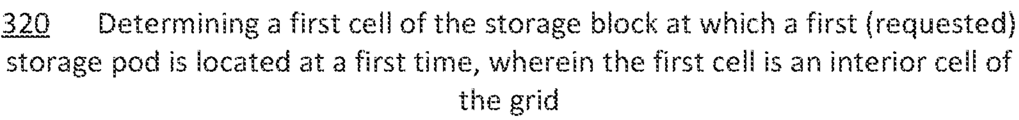

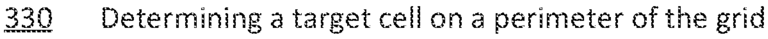

340 Determining a first path *d* between the first cell and the target cell

350 Determining a second cell of the grid that is unoccupied

360 Determining a second path *l* between a third cell adjacent to the first cell along the first path *d* and the second cell 370 Controlling at least a first robotic drive to shift storage pods along the second path *l* toward the second cell to render the third cell empty 380 Controlling the first robotic drive or a second robotic drive to move the first storage pod from the first cell to the third cell

FIG. 3

ROBOTIC RETRIEVAL FOR DENSE STORAGE

BACKGROUND

In a heterogeneous robotic processing facility, robotic drive systems can be used to move items and/or containers of items from one location to another. Robotic arms can be used to sort items by removing an item from one location and placing the item in a different, target location. Systems of such robots can be designed and deployed to accomplish a variety of tasks such as item retrieval, processing, and sortation.

BRIEF DESCRIPTION OF DRAWINGS

FIG. 3 is a flowchart describing an example process for robotic retrieval for dense storage, according to various aspects of the present disclosure.

DETAILED DESCRIPTION

Figure 1:
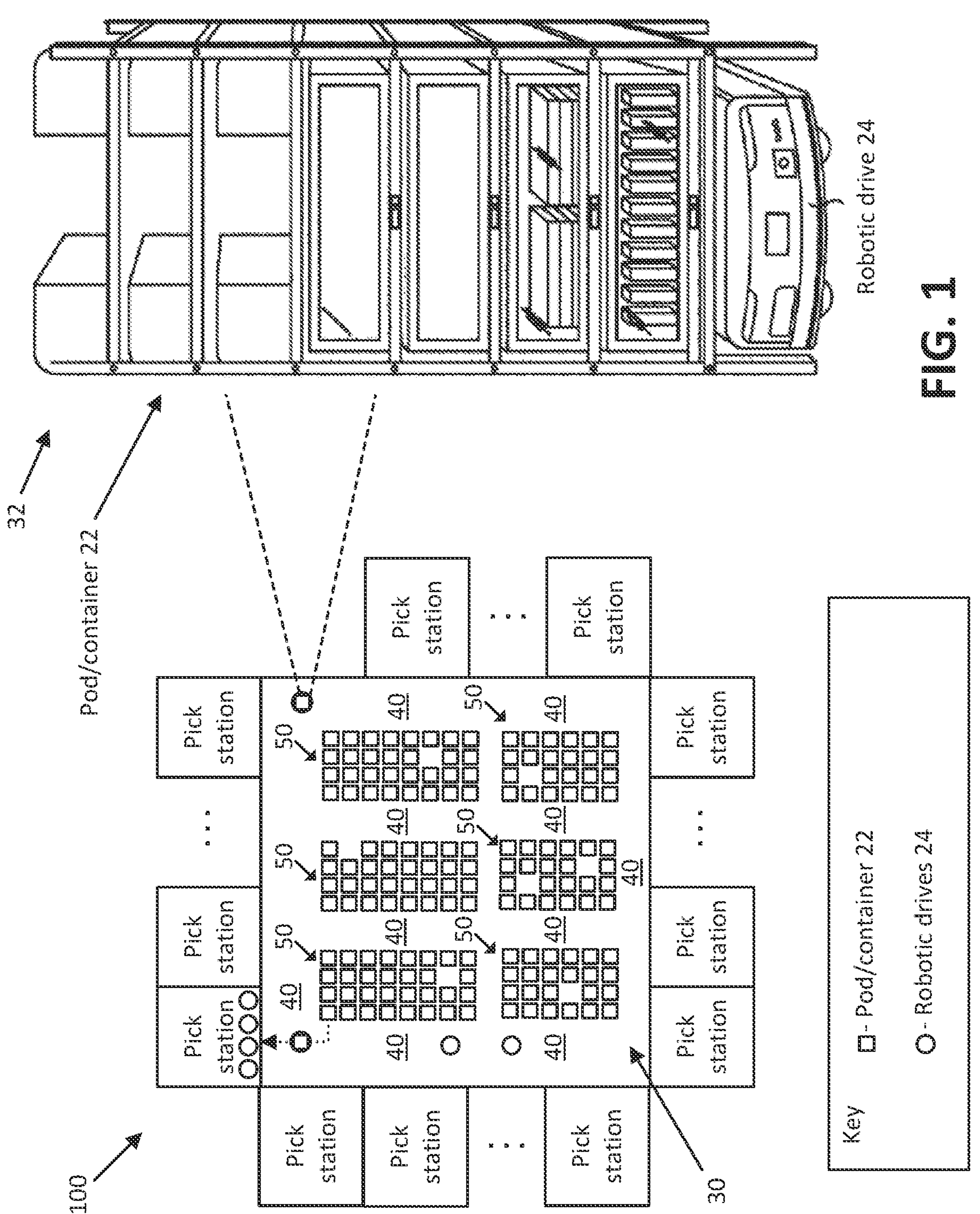
FIG. 1 is a diagram of an example overhead view of a robot-controlled storage field and pick stations, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic picking and sortation systems may be used in large-scale inventory processing and storage environments in which a large number of items are received, processed, stored, sorted, and sent out. For example, large-scale delivery and inventory management systems may use fulfillment centers and other large warehouses that may serve as part of the supply chain and can serve as a hub for logistics and processes used to get items from third party sellers to the purchaser.

In some cases, received items at a robotic fulfillment center may be placed in robot-controlled storage fields. For example, items may be stored in containers (sometimes referred to as "pods" (e.g., shelved units carrying inventory)). When an item is ordered and needs to be processed for shipment, instead of having a human worker find and walk to a storage shelf in a warehouse to "pick" the item, robotic drives may be controlled to select the pod (or other container) storing the item and may transport the pod to a pick station where a worker or another robot may pick the item from the pod and send the item for downstream processing.

Pods may be densely packed into "storage blocks" within a robot-controlled storage fields. A storage block may be a grid of pods and may be of rectangular or non-rectangular shape. Corridors may be maintained between adjacent storage blocks so that robotic drives (whether carrying a pod or unencumbered) may travel throughout the robot-controlled storage field in order to retrieve a pod, bring a pod to a picking station (or other station), or to provision robotic resources in an area of anticipated need. In various examples, robotic drive units may be able to pass under pods without lifting/carrying the pod in order to reach other pods or other areas. Robotic drives may use cameras and fiducial markings on a floor of the facility to navigate within the facility. The fiducial markings may be processed using computer vision algorithms executed by the robotic drives so that the robotic drive is able to determine its current location and navigate within the robot-controlled storage field.

In various examples, a particular pod may be requested. For example, the pod may hold an item that is to be shipped out. However, if the requested pod is located within an interior of a storage block (e.g., where it is surrounded by other pods), a path has to be cleared for the requested pod to the perimeter/exterior of the storage block so that the pod may be removed from the storage block and taken to the desired destination. In other words, obstacle pods may need to be removed from a path along which the requested pod travels so that the requested pod can be removed from the storage block. Reorganizing pods of a storage block so that a requested pod can be removed from the storage block may be referred to as "digging out" the pod, as part of a "dig out" mission.

In some examples, obstacle pods may be removed from the storage block by a robotic drive and taken to another location (e.g., a buffer location and/or another storage block that has occupancy) so that the requested pod can be removed from the storage block. However, in a large scale robot-controlled storage field many such dig out missions may be occurring at any given time. If obstacle pods are moved to other areas along the corridors between storage blocks, this can lead to congestion in robot drive traffic along the corridors which can result in delayed dig outs, delayed processing, and ultimately may impact item delivery.

Described herein are various systems and techniques for robotic retrieval for dense storage that may be used to perform such pod dig outs without contributing to robot drive traffic along the corridors of the robot-controlled storage fields. For example, a pre-determined minimum number of empty cells may be maintained per storage block. Instead of moving obstacle pods to different locations using travel space (e.g., corridors), the empty cells may be used as a resource to shuffle the pods within the storage block in a sliding tile fashion. The sequence of pod moves may be optimized by an algorithm such that the requested pod is placed at the perimeter of the storage block in the minimum time. While in some implementations, pods may be shuffled within the storage block without moving pods (besides the requested pod) outside of the storage. However, in some cases, logic may be used to determine whether it is more efficient to perform only intra-storage block shuffling or whether it is more efficient, at a given time/processing load, to move one or more pods outside of a storage block in order to dig out a requested pod.

It should be noted that robot-controlled storage fields and the various retrieval techniques may be used in other contexts beyond commercial delivery systems and in general may be used whenever items are to be stored and later retrieved from storage (e.g., warehouse inventory, equipment, archives, etc.). Accordingly, although many of the examples described herein use a package delivery example, the various dynamic allocation techniques used to control robotic resources may instead be deployed in other object-picking and/or sortation contexts. FIG. 1 is a scaled-down diagram of an example of a robot-controlled storage field and pick stations 100, according to various aspects of the present disclosure. In the example robot-controlled storage field and pick stations 100, a storage field 30 comprises storage blocks 50, with each storage block 50 including a grid of pods/containers 22. Robotic drives 24 may move along corridors 40 (e.g., to retrieve pods 22 from storage blocks 50, to take pods to pick stations, to return from pick stations to retrieve other pods 22, etc.). Robotic drives 24 may be configured to navigate the storage field 30 to locate specified pods/containers and may move the pod/container to a specific pick station. As shown, the pick stations may be located along the perimeter of the storage field 30 (e.g., for safety) although, other implementations and/or floor plans may be used, as desired. As shown in image 32, the robotic drive 24, in some examples, may drive under the pod/container 22 and may lift the pod/container and navigate to the appropriate pick station. A human and/or another robot at the pick station may locate the relevant item or items from the pod/container 22 (e.g., according to an item order list) and may remove those items for further processing. Although not shown in FIG. 1, robotic drives 24 may pass under pods without contacting the pods. Robotic drives 24 may employ a lifting mechanism (e.g., a hydraulic lift mechanism, a pneumatic lift mechanism, etc.) to lift a requested pod in order to carry the pod to a desired location (e.g., a particular pick station).

As shown in FIG. 1, there may be one or more unoccupied cells (e.g., a cell in the storage block grid that is not occupied by a storage pod) within the storage blocks 50. As described in further detail below, when a requested pod is within the interior of a storage block 50 (e.g., any cell within the storage block grid that is not on the perimeter/exterior of the storage block), robotic drives 24 may shuffle the pods within the interior of the storage block 50 in order to create a pathway to a cell that is on the perimeter of the storage block 50 so that the requested pod may be moved out of the storage block 50 (e.g., to a pick station). The term “cell” as used herein, refers to a position within a storage block. Cells may be occupied when a storage pod is located within the cell. Conversely, cells may be unoccupied or empty when no storage pod is currently sitting within the cell.

Figures 2A, 2B:
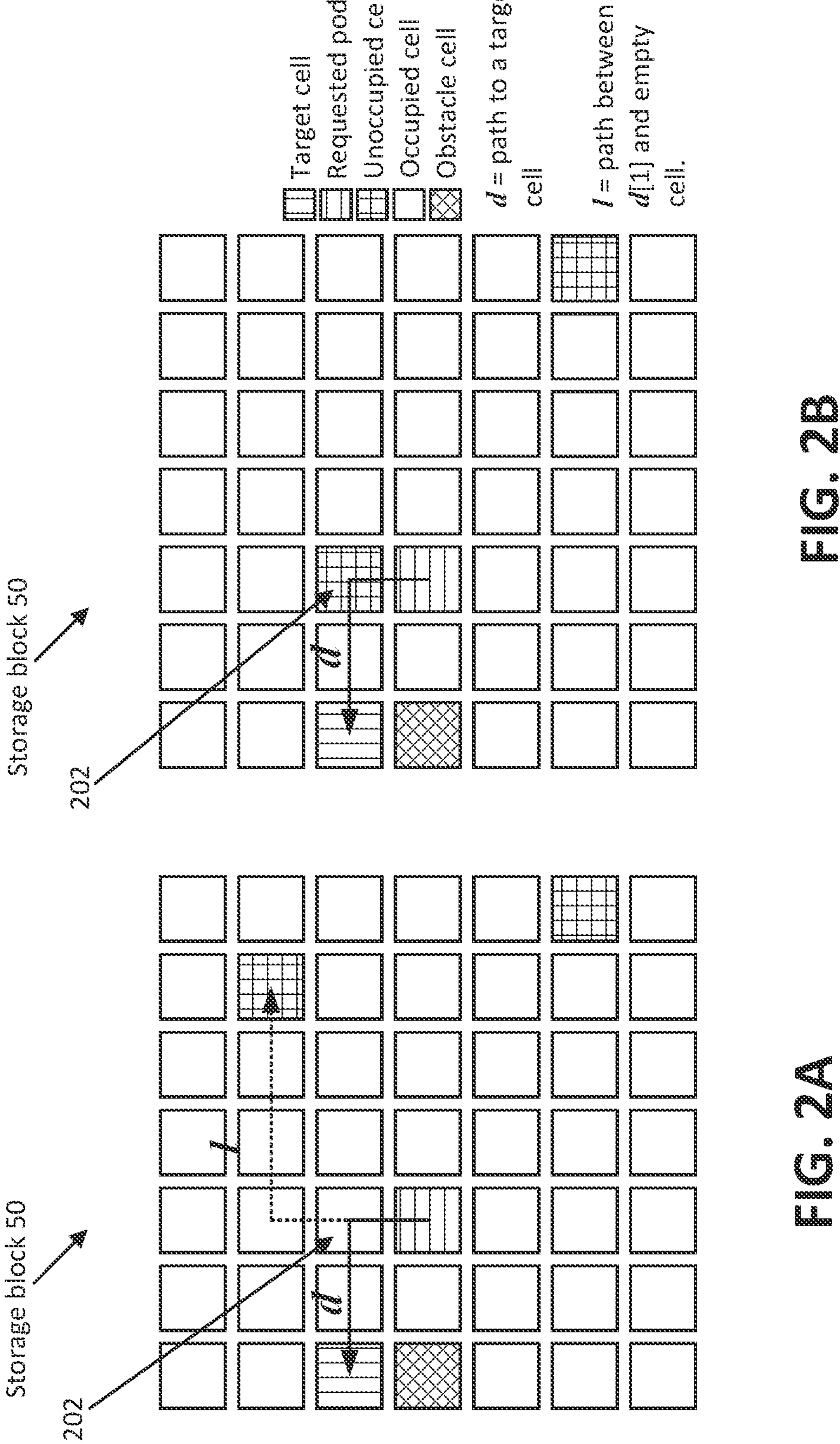
FIGS. 2A-2F depict an example of control of robot drives for a dense storage retrieval, in accordance with various aspects of the present disclosure.

FIGS. 2A-2F depict an example of control of robot drives for a dense storage retrieval, in accordance with various aspects of the present disclosure. In the example of FIG. 2A, a requested storage pod (“Requested pod”) is identified. The requested pod is a pod that is the subject of a dig out mission. The requested pod in FIG. 2A is the pod with horizontal stripes. The goal of the dig out mission is to position the requested pod at the target cell (a cell on the perimeter/exterior of the storage block 50). The particular target cell may be selected based on, for example, a proximity of the target cell to a destination (e.g., the pick station to which the requested pod is to be carried). An obstacle cell represents a cell that cannot be occupied by a storage pod or robotic drive. For example, an obstruction (such as a structural column of the building in which the robot-controlled storage field is located) may exist in the obstacle cell. While FIGS. 2A-2F describe example logic for one approach to digging out pods for dense storage retrieval, other implementations and techniques apart from what is specifically described in reference to FIGS. 2A-2F may be used.

In FIG. 2A, there are two unoccupied cells within the storage block 50. Path d may be selected as the path from the current cell in which the requested pod is located to the target cell along the exterior/perimeter of the storage block 50. In some examples, d may be selected as the shortest path from the current cell in which the requested pod is located to the target cell along the exterior/perimeter of the storage block 50. Robotic drives can move storage pods vertically or horizontally within the grid shown, but not diagonally. Next, the path/between cell 202 (a cell that is adjacent to the requested pod along the path d) and the unoccupied cell may be determined. In some examples, the path/may be selected as the shortest path between cell 202 and the unoccupied cell. All storage pods along the path/are shifted toward the unoccupied cell. The storage pods are shifted along the path/using one or more robotic drives to lift and carry the drives.

Figures 2C, 2D:
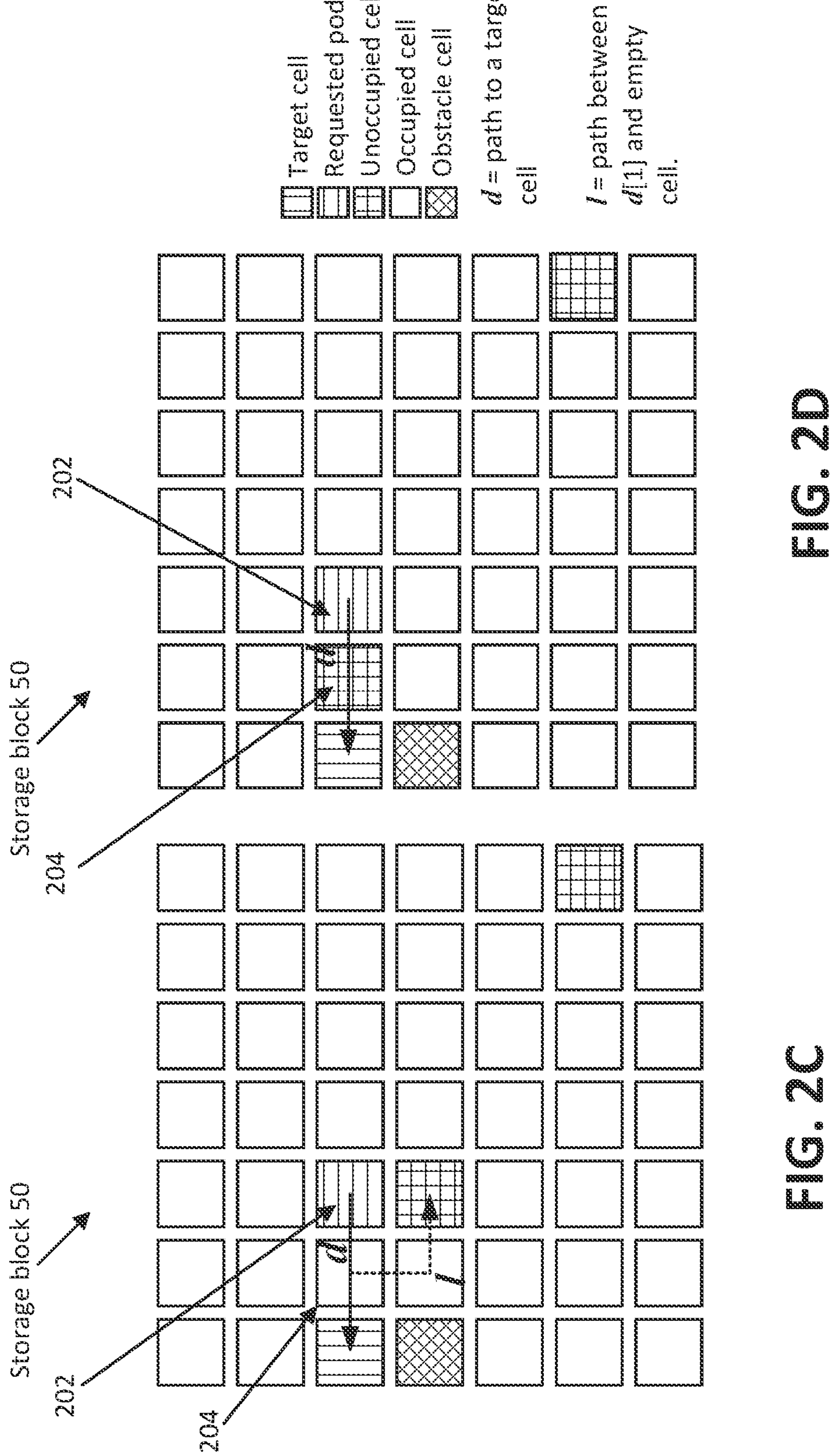

This operation changes the state of the storage block 50 from the configuration shown in FIG. 2A to the configuration shown in FIG. 2B. As shown in FIG. 2B, the previously unoccupied cell from FIG. 2A is now occupied due to the shifting of the storage pods and cell 202 (which previously included an obstacle storage pod in FIG. 2A) is now an empty, unoccupied cell. Accordingly, the requested pod may now be moved along path d by a robotic drive into cell 202. This configuration is shown in FIG. 2C. When the requested pod is moved into cell 202, the cell previously occupied by the requested pod is now left unoccupied.

Accordingly, as shown in FIG. 2C, the path/may again be determined between cell 204 (a cell that is adjacent to the requested pod along the path d to the target cell) and the unoccupied cell may again be determined. Again, all storage pods along the path/are shifted toward the unoccupied cell. The storage pods are shifted along the path/using one or more robotic drives to lift and carry the drives.

Figures 2E, 2F:
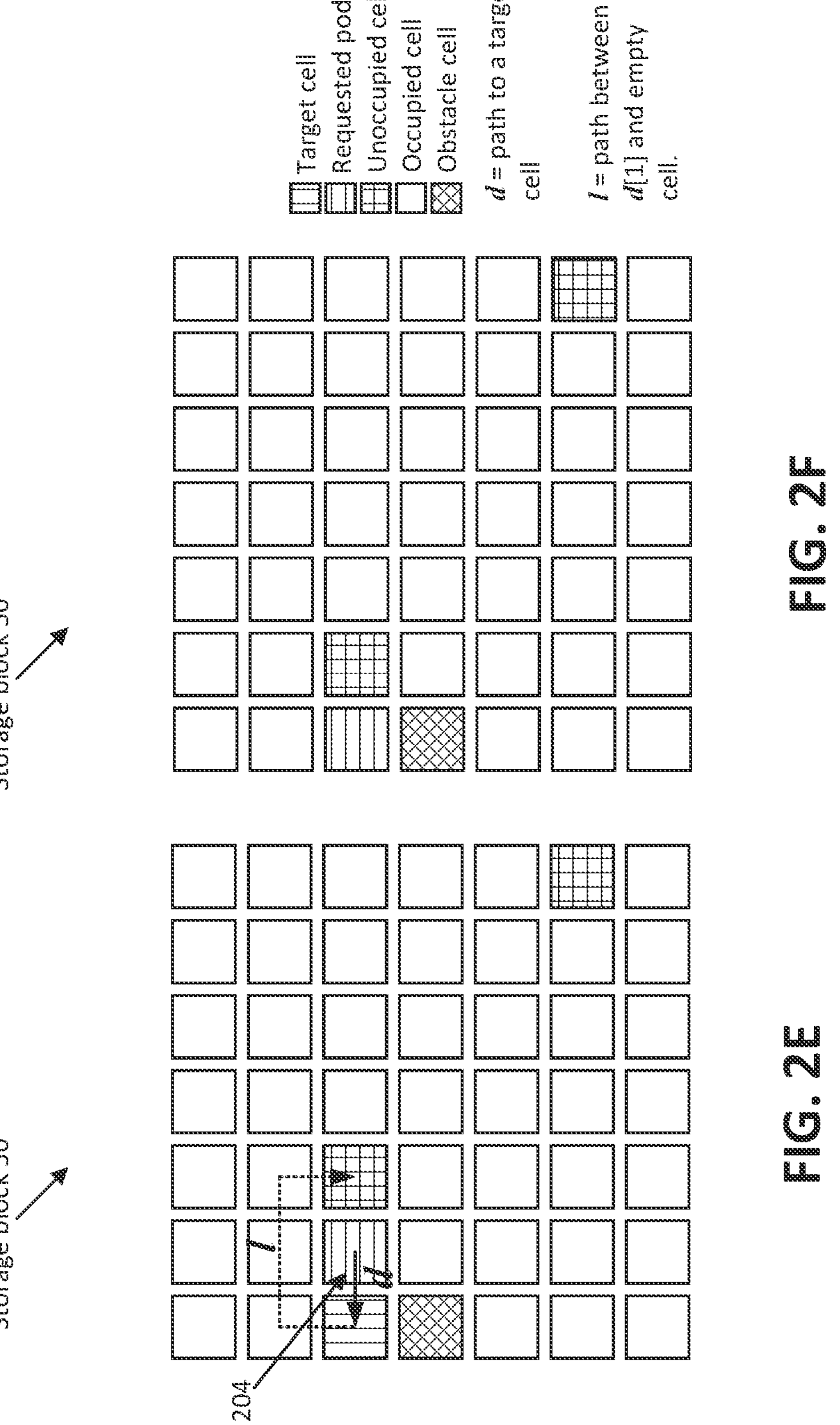

This operation changes the state of the storage block 50 from the configuration shown in FIG. 2C to the configuration shown in FIG. 2D. As shown in FIG. 2D, the previously unoccupied cell from FIG. 2C is now occupied due to the shifting of the storage pods and cell 204 (which previously included an obstacle storage pod in FIG. 2A) is now an empty, unoccupied cell. Accordingly, the requested pod may now be moved along path d by a robotic drive into cell 204. This configuration is shown in FIG. 2E, where the requested pod is moved into cell 204. When the requested pod is moved into cell 204, the cell previously occupied by the requested pod is now left unoccupied.

Accordingly, as shown in FIG. 2E, the path/may again be determined between the target cell (the cell that is adjacent to the requested pod along the path d to the target cell) and the unoccupied cell may again be determined. Again, all storage pods along the path/are shifted toward the unoccupied cell. The storage pods are shifted along the shortest path/using one or more robotic drives to lift and carry the drives. In the example of FIG. 2E, this shift of storage pods along the path/leaves the target cell unoccupied. Accordingly, the requested pod may be moved into the target cell (as shown in FIG. 2F). Thereafter, the requested pod may be egressed from the storage block 50 as there are no more blocking/obstacle storage pods in the way.

Generally, the algorithm for a dig out mission shuffles pods in a sliding puzzle fashion such that requested pods are moved to the boundary of the storage block. In some examples, all the pod moves necessary to achieve this objective may be constrained to the space dedicated to the storage block, thus avoiding the use of travel fiducials (by which robotic drives may otherwise navigate). However, in some examples, pod moves may carry pods outside of the storage block (e.g., such as at times during which there is low congestion within the robot-controlled storage field). The number of empty cells in the storage block may be a determining factor for how many dig out missions can be performed in parallel and thus the total dig out capacity of the storage block. One example strategy (according to the illustrated example in FIGS. 2A-2F) for moving the requested pod may be to repeatedly clear the first cell along the shortest path ($d_t$) to a target cell t at the boundary/perimeter of the storage block. This is done by shifting all the pods along the path (l) (e.g., the shortest path) to an empty cell. Every time the next cell along dis cleared, the pod is moved and the same process is repeated, as described above.

The algorithm for a dig out mission may be logically described in terms of different layers.

An activity definition layer may define a dig out mission for each requested pod in the relevant storage block. The activity definition layer may select a target cell and an empty cell that will be used to shuffle the pods. This may be accomplished by solving a bi-partite matching problem to minimize the total number of pod moves for all dig outs at a given moment in time. As the heuristic used to move the pods is known and fixed, the expected number of pod moves for a single digout mission may be determined as a function of the choice of the free cell f:

$$N_p(f) = \min_{t \in S}(len(l_f) + 1 + 5 * (len(d_t) - 1) - 2 * \text{n\_turns}) \quad \text{Eq. 1}$$

Where S is the set of cells at the boundary of the storage block and the number of turns is determined by the shortest path $d_t$. After calculating N for every pod in the set of all requested pods Q, the free cells may be assigned to dig outs such as to minimize $\Sigma_{p \in Q} N_p$.

A planning layer may determine the sequence of all pod moves according to the presented heuristic and the dig out missions specified in the previous layer.

An execution layer is responsible for allocating a robotic drive to each pod move determined by the planning layer and for resolving any potential conflict between two dig out missions. The robotic drive assignment may be decided by solving another bi-partite matching problem to minimize the total traveled distance necessary for the robotic drives to travel to and lift the storage pods in the next n moves of each dig out mission in the storage block. The problem may be constrained to not allow a difference of more than one allocated robotic drive between two dig out missions. The execution layer may send control instructions to the allocated robotic drives to control the robotic drives to perform the determined operations.

To avoid one dig out mission interfering with another (e.g., moving another requested pod or shifting/occupying an empty cell in use by other missions), the execution layer may include a space allocator. This space allocator may be responsible for granting segments of the sequence of pod moves for each dig out mission. As all pod moves happen along the path l, except for a single pod move (per update of l) along d, the space allocator grants the entire path of l on a first come first serve basis. If some cell along l is granted to another digout mission, the space allocator can grant partial segments. As previously noted, the above algorithm and the example depicted in FIGS. 2A-2F describe one possible implementation that may be used for dense storage retrieval. However, the techniques may be modified or other techniques may be used according to the desired implementation.

FIG. 3 is a flowchart describing an example process 300 for robotic retrieval for dense storage, according to various aspects of the present disclosure. Those portions of FIG. 3 that have been previously discussed in reference to FIGS. 1-2F may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 may begin at action 310, at which a storage block including a grid of a plurality of storage pods in a robot-controlled storage field may be determined. The grid may include a plurality of cells with each cell representing a position within the grid that is occupiable by a storage pod. Processing may continue at action 320, at which a first cell of the first storage block at which a first (requested) storage pod is located at a first time may be determined. The first storage pod may be a requested pod that is to be dug out from the interior of the first storage block. For example, the first storage pod may carry an item that is the subject of a pending order.

Processing may continue at action 330, at which a target cell on a perimeter of the grid of the storage block may be determined. The target cell may be selected based on proximity to the first cell at which the first requested storage pod is located and/or based on other considerations such as concurrent dig out missions within the storage block, a location of a destination of the first storage pod (e.g., a pick station to which the first storage pod is to be taken), etc.

Processing may continue at action 340, at which a first path d (e.g., the shortest path) between the first cell and the target cell may be determined. For example, the first path may represent a path that includes the minimum number of cells of the grid through which the first storage pod must travel in order to reach the target cell. Processing may continue at action 350, at which a second cell of the grid may be determined. The second cell may be an unoccupied (empty) cell that is not currently occupied by any storage pod.

Processing may continue at action 360, at which a second path/may be determined between a third cell adjacent (nearest) to the first cell along the first path d and the second cell (i.e., the empty cell). In some examples, the second path/may be the shortest path between the third cell adjacent to the first cell along the first path d and the second cell (i.e., the empty cell). Processing may continue at action 370, at which at least a first robotic drive may be controlled to shift storage pods along the second path/toward the second (unoccupied) cell to render the third cell empty. The goal of the action 370 may be to remove any obstacle storage pod from the cell that is adjacent to the current location of the first requested storage pod along the shortest path d to the target cell, so that the first requested storage pod may be moved along the path d toward the target cell.

Processing may continue at action 380, at which the first robotic drive or a second robotic drive may be controlled to move the first storage pod from the first cell to the third cell. Accordingly, the first (requested) storage pod may be moved along the first path d toward the target cell. This process may be repeated (e.g., as described in FIGS. 2A-2F) until the first (requested) storage pod reaches the target cell. Once the first (requested) storage pod reaches the target cell, the first (requested) storage pod may be egressed from the storage block.

Figure 4:
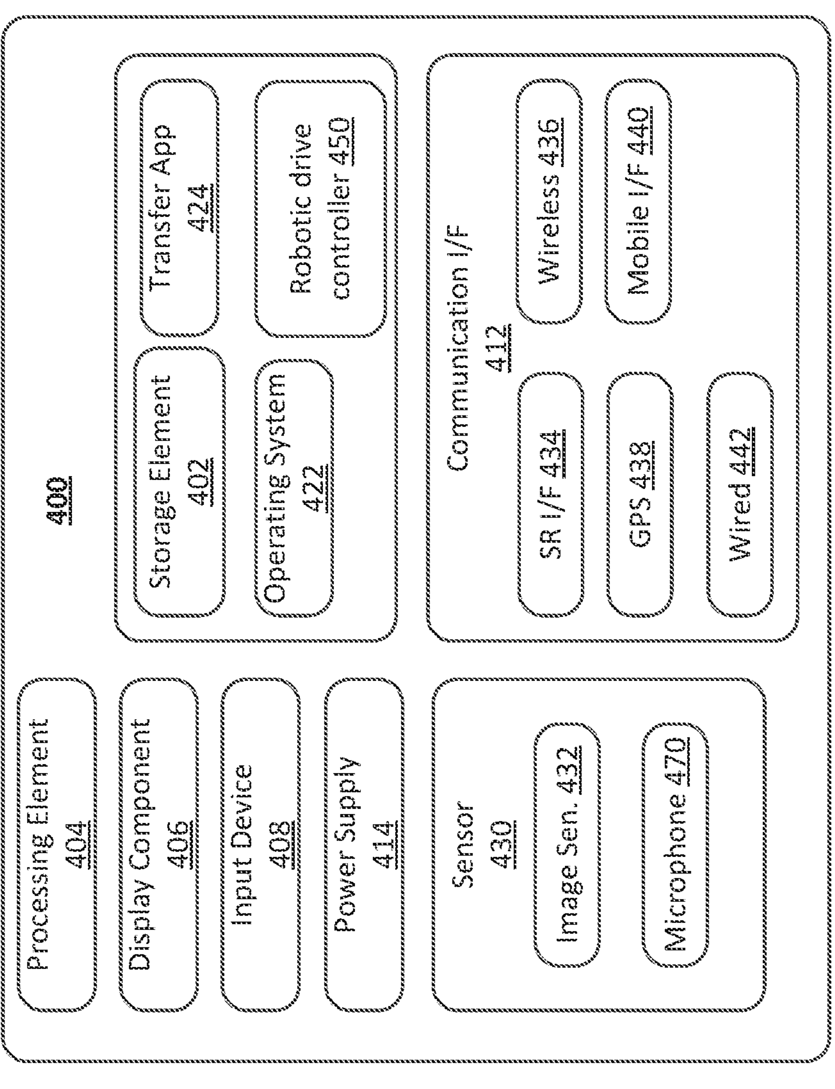
FIG. 4 is an example computing device architecture that may be used in accordance with various techniques described herein.

FIG. 4 is an example computing device architecture 400 that may be used in accordance with various techniques described herein. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of non-transitory computer-readable memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. Additionally, storage element 402 may store computer-executable instructions configured to implement the robotic drive controller 450 described herein.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. The robotic drive controller 450 may include executable instructions to control robotic drives to perform the various dig out missions described in the current disclosure.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display input images generated in accordance with the various techniques described herein. In various examples, the display component 406 may be a wearable display (e.g., in a headset, goggles, and/or glasses) that may display the various graphical highlight data, graphical navigational hints, text, other graphical data, etc., described herein. In some examples, the architecture 400 may include one or more speakers effective to output audio.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information. In various examples, the image sensor 432 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 5:
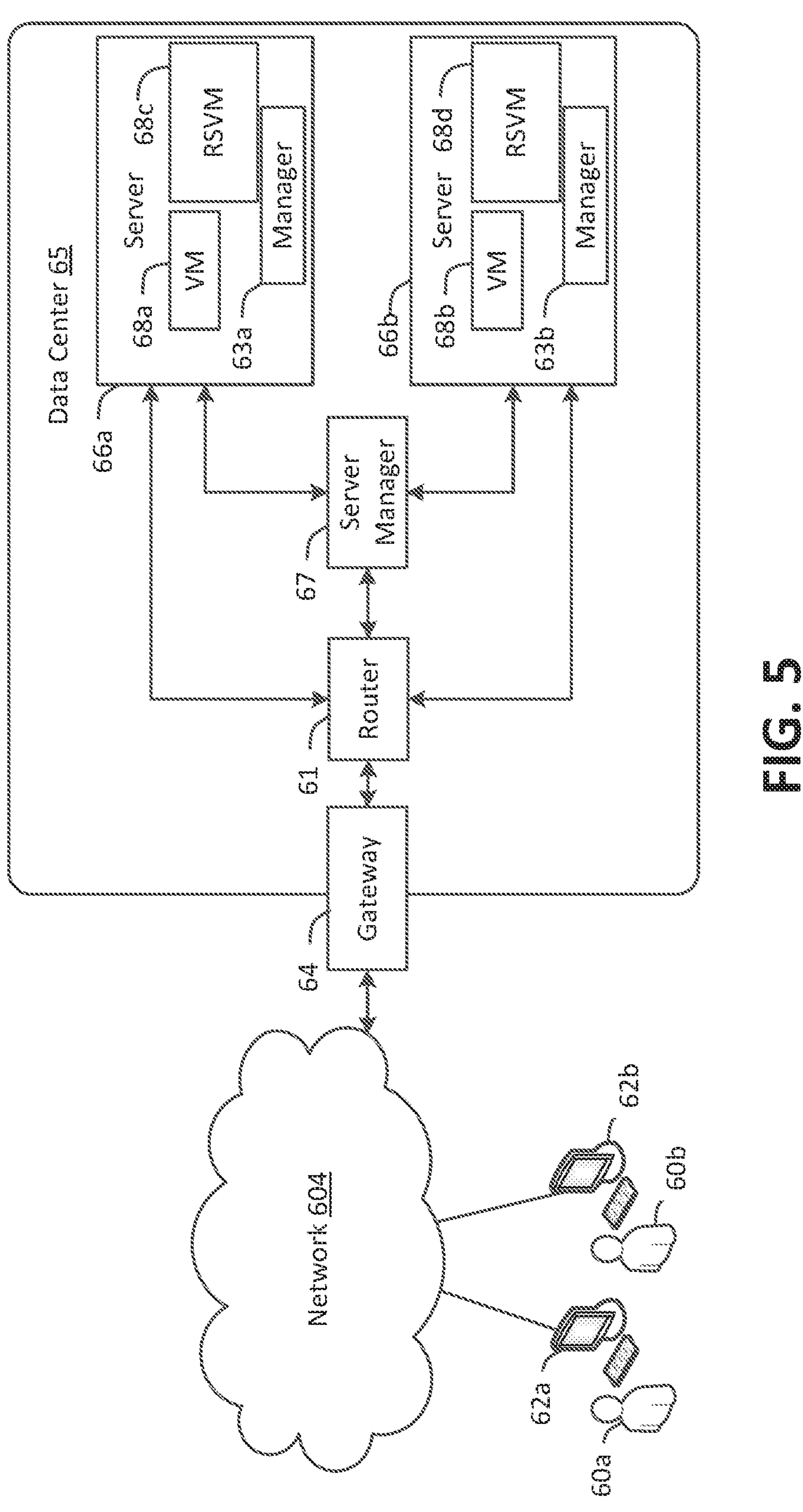
FIG. 5 is a diagram illustrating an example system for sending and providing data that may be used in accordance with the present disclosure.

An example system for sending and providing data that may be used to perform one or more of the various techniques described herein will now be described in detail. In particular, FIG. 5 illustrates an example computing environment in which the embodiments described herein may be implemented. For example, the computing environment of FIG. 5 may be configured to dynamically allocate robotic resources as a service over a network wherein one or more of the techniques described herein may be requested by a first computing device and may be performed by a different computing device configured in communication with the first computing device over a network. FIG. 5 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources-consisting of many processors, large amounts of memory and/or large storage capacity- and small resources-consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 5 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 5, a router 61 may be utilized to interconnect the servers 66*a* and 66*b*. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 5, a data center 65 is also employed to at least in part direct various communications to, from and/or between servers 66*a* and 66*b*. While FIG. 5 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 65 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memorfsey (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

determining a storage block comprising a grid of a plurality of storage pods in a robot-controlled storage field, wherein each storage pod of the plurality of storage pods comprises a plurality of items, and wherein the grid comprises a plurality of cells, wherein each cell of the plurality of cells represents a position within the grid occupiable by a storage pod;

determining an item disposed on a first storage pod of the plurality of storage pods;

determining a target cell of the plurality of cells, wherein the target cell is a perimeter cell of the storage block; and performing a repeated pathway generation process, wherein each repetition of the repeated pathway generation process comprises:

determining, based on a current location of the first storage pod and the target cell, a first pathway d as a shortest pathway from the current location of the first storage pod to the target cell, determining, based on the current location of the first storage pod, a first nearest unoccupied cell, determining, based on the first pathway d and the first nearest unoccupied cell, a second pathway l between a first cell adjacent to the current location of the first storage pod along the first pathway d and the first nearest unoccupied cell, controlling at least a first robotic drive to move a first set of the plurality of storage pods along the second pathway l, wherein movement of the first set of the plurality of storage pods results in the first cell adjacent to the current location being unoccupied, controlling the first robotic drive or a second robotic drive to move the first storage pod to the first cell adjacent to the current location, determining an updated location of the first storage pod, in an instance where the updated location of the first storage pod is not located at the target cell, performing another repetition of the repeated pathway generation process, and in an instance where the updated location of the first storage pod is located at the target cell, ending the repeated pathway generation process.

2. The method of claim 1, wherein moving the first storage pod from the first cell to the first cell adjacent to the current location renders the first cell empty, the method further comprising:

determining a third pathway between the first cell and a second cell adjacent to the current location of the first storage pod, wherein the second cell adjacent to the current location of the first storage pod includes an obstacle pod;

controlling at least the first robotic drive to shift a second set of the plurality of storage pods along the third pathway toward the first cell to render the second cell adjacent to the current location of the first storage pod empty; and controlling the first robotic drive or the second robotic drive to move the first storage pod from the current location to the second cell adjacent to the current location of the first storage pod.

3. The method of claim 2, wherein moving the first storage pod from the current location to the second cell adjacent to the current location of the first storage pod renders an empty cell, the method further comprising:

determining a fourth pathway between the target cell and the empty cell;

controlling at least the first robotic drive to shift a third set of the plurality of storage pods along the fourth pathway toward the empty cell to render the target cell empty; and controlling the first robotic drive or the second robotic drive to move the first storage pod to the target cell.

4. A method comprising:

determining a storage block comprising a grid of a plurality of storage pods in a robot-controlled storage field, wherein each storage pod of the plurality of storage pods comprises a plurality of items, and wherein the grid comprises a plurality of cells, wherein each cell of the plurality of cells represents a position within the grid occupiable by a storage pod;

determining a first storage pod located at a first cell of the grid, wherein the first cell is an interior cell of the grid;

determining a target cell of the grid, wherein the target cell is an exterior cell of the grid; and determining a repeated pathway generation process, wherein each repetition of the repeated pathway generation process comprises:

determining, based on the first cell and the target cell, a first pathway, determining, based on the first cell, a first unoccupied cell of the grid, determining, based on the first pathway and the first unoccupied cell, a second pathway, controlling at least a first robotic drive to move a first set of storage pods, wherein movement of the first set of storage pods along the second pathway results in a second unoccupied cell adjacent to the first cell along the first pathway, controlling a second robotic drive to move the first storage pod to the second unoccupied cell, determining if the first storage pod is located at the target cell, in an instance where the first storage pod is not located at the target cell, performing another repetition of the repeated pathway generation process, and in an instance where the first storage pod is located at the target cell, ending the repeated pathway generation process.

5. The method of claim 4, further comprising:

determining a first shortest path between the first cell and the target cell, wherein the target cell is located on a perimeter of the grid; and determining a second shortest path between a second cell adjacent to the first cell along the first shortest path and the first cell, wherein the second cell includes a first obstacle pod.

6. The method of claim 5, wherein the controlling at least the first robotic drive to shift the first set of storage pods toward the first unoccupied cell of the grid renders the second cell empty, the method further comprising:

controlling the first robotic drive or a second robotic drive to move the first storage pod from the first cell to the second cell.

7. The method of claim 6, wherein the controlling the at least the first robotic drive to move the first storage pod from the first cell to the second cell renders the first cell empty, the method further comprising:

determining a third shortest path between a third cell nearest to the first storage pod along the first shortest path and the first cell, wherein the third cell includes a second obstacle pod.

8. The method of claim 7, further comprising controlling at least the first robotic drive to shift a second set of the plurality of storage pods located along the third shortest path.

9. The method of claim 8, further comprising controlling the first robotic drive or a second robotic drive to move the first storage pod from the second cell to the third cell.

10. The method of claim 4, further comprising:

positioning the first storage pod at a perimeter of the storage block based at least in part on an item stored by the first storage pod.

11. The method of claim 4, further comprising:

positioning the first storage pod at a perimeter of the storage block based at least in part on a first item stored by the first storage pod being at a first position in a list; and positioning a second storage pod at a location in the storage block that is one row or column of cells away from the perimeter based at least in part on a second item stored by the second storage pod being at a second position in the list.

12. The method of claim 11, wherein the list indicates that the first item is to be retrieved prior to the second item.

13. A system comprising:

at least one processor; and non-transitory computer-readable memory storing instructions that, when executed by the at least one processor, are effective to:

determine a storage block comprising a grid of a plurality of storage pods in a robot-controlled storage field, wherein each storage pod of the plurality of storage pods comprises a plurality of items, and wherein the grid comprises a plurality of cells, wherein each cell of the plurality of cells represents a position within the grid occupiable by a storage pod;

determine a first storage pod located at a first cell of the grid, wherein the first cell is an interior cell of the grid;

determine a target cell of the grid, wherein the target cell is an exterior cell of the grid; and determine a repeated pathway generation process, wherein each repetition of the repeated pathway generation process comprises:

determine, based on the first cell and the target cell, a first pathway, determine, based on the first cell, a first unoccupied cell of the grid, determine, based on the first pathway and the first unoccupied cell, a second pathway, control at least a first robotic drive to shift a first subset of the plurality of storage pods toward the first unoccupied cell, wherein movement of the first subset of the plurality of storage pods along the second pathway results in a second unoccupied cell adjacent to the first cell along the first pathway, control a second robotic drive to move the first storage pod to the second unoccupied cell, determine if the first storage pod is located at the target cell, in an instance where the first storage pod is not located at the target cell, performing another repetition of the repeated pathway generation process, and in an instance where the first storage pod is located at the target cell, ending the repeated pathway generation process.

14. The system of claim 13, the non-transitory computer-readable memory storing further instructions that, when executed by the at least one processor, are further effective to:

determine a first shortest path between the first cell and the target cell, wherein the target cell is located on a perimeter of the grid; and determine a second shortest path between a second cell adjacent to the first cell along the first shortest path and the first cell, wherein the second cell includes a first obstacle pod.

15. The system of claim 14, wherein the controlling at least the first robotic drive to shift the first subset of the plurality of storage pods toward the first unoccupied cell of the grid renders the second cell empty, and wherein the non-transitory computer-readable memory stores further instructions that, when executed by the at least one processor, are further effective to:

control the first robotic drive or a second robotic drive to move the first storage pod from the first cell to the second cell.

16. The system of claim 15, wherein the controlling at least the first robotic drive to move the first storage pod from the first cell to the second cell renders the first cell empty, and wherein the non-transitory computer-readable memory stores further instructions that, when executed by the at least one processor, are further effective to:

determine a third shortest path between a third cell nearest to the first storage pod along the first shortest path and the first cell, wherein the third cell includes a second obstacle pod.

17. The system of claim 16, the non-transitory computer-readable memory storing further instructions that, when executed by the at least one processor, are further effective to:

control at least the first robotic drive to shift a second subset of the plurality of pods located along the third shortest path.

18. The system of claim 17, the non-transitory computer-readable memory storing further instructions that, when executed by the at least one processor, are further effective to control the first robotic drive or a second robotic drive to move the first storage pod from the second cell to the third cell.

19. The system of claim 13, the non-transitory computer-readable memory storing further instructions that, when executed by the at least one processor, are further effective to:

position the first storage pod at a perimeter of the storage block based at least in part on an item stored by the first storage pod.

20. The system of claim 13, the non-transitory computer-readable memory storing further instructions that, when executed by the at least one processor, are further effective to:

position the first storage pod at a perimeter of the storage block based at least in part on a first item stored by the first storage pod being at a first position in a list; and position a second storage pod at a location in the storage block that is one row or column of cells away from the perimeter based at least in part on a second item stored by the second storage pod being at a second position in the list.

* * * * *